US011933193B2

(12) United States Patent
Patil et al.

(10) Patent No.: US 11,933,193 B2
(45) Date of Patent: Mar. 19, 2024

(54) TURBINE ENGINE WITH AN AIRFOIL HAVING A SET OF DIMPLES

(71) Applicants: GE Avio S.r.l., Rivalta di Torino (IT); GENERAL ELECTRIC COMPANY, Schenectady, NY (US)

(72) Inventors: Pratish Patil, Bangalore (IN); Amit Goyal, Bangalore (IN); Mahendran Manoharan, Bangalore (IN); Francesco Bertini, Piossasco (IT); Jaikumar Loganathan, Bangalore (IN)

(73) Assignees: GE Avio S.r.l., Rivalta di Torino (IT); General Electric Company, Schenectady, NY (US)

( * ) Notice: Subject to any disclaimer, the term of this patent is extended or adjusted under 35 U.S.C. 154(b) by 0 days.

(21) Appl. No.: 17/529,685

(22) Filed: Nov. 18, 2021

(65) Prior Publication Data
US 2022/0220854 A1 Jul. 14, 2022

(30) Foreign Application Priority Data
Jan. 8, 2021 (IT) .................. 102021000000296

(51) Int. Cl.
 *F01D 5/14* (2006.01)
(52) U.S. Cl.
 CPC .......... *F01D 5/145* (2013.01); *F05D 2240/31* (2013.01)
(58) Field of Classification Search
 CPC . F01D 5/141; F01D 5/145; F01D 5/14; F05D 2240/31
 USPC ............................................ 416/236 R, 243
 See application file for complete search history.

(56) References Cited

U.S. PATENT DOCUMENTS

| | | | |
|---|---|---|---|
| 3,741,285 A | 6/1973 | Kuethe | |
| 4,720,239 A | 1/1988 | Owczarek | |
| 4,932,610 A | 6/1990 | Maestrello | |
| 4,941,803 A | 7/1990 | Wainauski et al. | |
| 5,209,644 A | 5/1993 | Dorman | |
| 5,480,284 A | 1/1996 | Wadia et al. | |
| 5,609,470 A | 5/1997 | Dodd | |
| 5,876,182 A | 3/1999 | Schulte | |
| 5,904,470 A | 5/1999 | Kerrebrock et al. | |
| 6,227,800 B1 | 5/2001 | Spring et al. | |

(Continued)

FOREIGN PATENT DOCUMENTS

| | | |
|---|---|---|
| CN | 101321949 A | 12/2008 |
| CN | 112177680 A | 1/2021 |

(Continued)

OTHER PUBLICATIONS

Volino, Ralph J., U.S. Naval Academy, MD; "Separation Control On Low-pressure Turbine Airfoils Using Synthetic Vortex Generator Jets"; ASME Turbo Expo 2003 Power for Land, Sea, and Air; 2003.

(Continued)

*Primary Examiner* — Michael L Sehn
(74) *Attorney, Agent, or Firm* — McGarry Bair PC

(57) ABSTRACT

A gas turbine engine comprising a set of circumferentially adjacent airfoils, the airfoils having an outer wall defining a pressure side and a suction side extending between a leading edge and a trailing edge to define a stream-wise direction, and between a root and a tip to define a span-wise direction, and a set of dimples provide on the outer wall of at least one of the airfoils, the set of dimples spaced in at least one of the stream-wise or span-wise directions.

19 Claims, 11 Drawing Sheets

(56) References Cited

U.S. PATENT DOCUMENTS

| | | |
|---|---|---|
| 6,270,315 B1 | 8/2001 | Greim et al. |
| 6,301,874 B1 | 10/2001 | Wakazono et al. |
| 6,302,360 B1 | 10/2001 | Ng |
| 6,316,048 B1 | 11/2001 | Steibel et al. |
| 6,340,285 B1 | 1/2002 | Gonyou et al. |
| 6,382,921 B1 | 5/2002 | Selig et al. |
| 6,412,732 B1 | 7/2002 | Amitay et al. |
| 6,416,289 B1 | 7/2002 | Ramesh et al. |
| 6,435,815 B2 | 8/2002 | Harvey et al. |
| 6,505,673 B1 | 1/2003 | Abuaf et al. |
| 6,547,524 B2 | 4/2003 | Kohli et al. |
| 6,565,312 B1 | 5/2003 | Horn et al. |
| 6,612,114 B1 | 9/2003 | Klingels |
| 6,758,651 B2 | 7/2004 | Tomita et al. |
| 6,976,826 B2 * | 12/2005 | Roy ............... F01D 5/20 416/500 |
| 7,985,050 B1 | 7/2011 | Liang |
| 10,450,867 B2 | 10/2019 | Bunker |
| 10,450,950 B2 | 10/2019 | Weber |
| 2001/0036401 A1 | 11/2001 | Harvey et al. |
| 2002/0122716 A1 | 9/2002 | Beacock et al. |
| 2003/0085324 A1 | 5/2003 | Battisti |
| 2005/0103944 A1 | 5/2005 | Greenblatt |
| 2005/0260076 A1 | 11/2005 | Daux et al. |
| 2006/0073016 A1 | 4/2006 | Liang |
| 2006/0102801 A1 | 5/2006 | Manley |
| 2007/0110585 A1 | 5/2007 | Bonnet |
| 2007/0212228 A1 | 9/2007 | Digard Brou De Cuissart et al. |
| 2008/0232971 A1 | 9/2008 | Ahmad et al. |
| 2009/0162204 A1 | 6/2009 | Aggarwala et al. |
| 2010/0034663 A1 | 2/2010 | Elliott et al. |
| 2011/0268578 A1 | 11/2011 | Praisner et al. |
| 2018/0119555 A1 * | 5/2018 | Vogiatzis ............... F01D 9/041 |
| 2019/0292915 A1 * | 9/2019 | Eastwood ............... F01D 9/041 |
| 2020/0182071 A1 | 6/2020 | Spangler et al. |
| 2020/0200388 A1 * | 6/2020 | Garner ............... F01D 5/145 |

FOREIGN PATENT DOCUMENTS

| | | |
|---|---|---|
| DE | 102004038930 A1 | 2/2006 |
| DE | 102016003352 A1 | 9/2017 |
| EP | 2369133 B1 | 7/2015 |
| EP | 3211314 A1 | 8/2017 |
| EP | 3543463 B1 | 8/2021 |
| EP | 3088290 B1 | 10/2021 |
| JP | H11117703 A | 10/1997 |
| WO | 2009080316 A2 | 2/2008 |
| WO | 2008136697 A1 | 11/2008 |

OTHER PUBLICATIONS

Volino, Ralph J., U.S. Naval Academy, MD; "Passive Flow Control On Low-pressure Turbine Airfoils"; ASME Turbo Expo 2003 Power for Land, Sea, and Air; 2003.

Bons, Jeffrey P., Air Force Institute of Technology OH; The Fluid Dynamics Of LPT Blade Separation Control Using Pulsed Jets; ASME Turbo Expo 2001; 2001.

Bigoni, F., et al., von Karman Institute for Fluid Dynamics; Numerical Study on the Effects of the Upstream Wake Generator on the Aerodynamic Performance of a High-Lift Low Pressure Turbine Blade; ASME. Turbo Expo: 2016; 2016.

Lin, Ray-Sing and Sharma, Om P., UTC Research Center; "An Analytical Investigation On The Impact Of Wall Cooling On The Development Of Boundary Layers On The Suction Sides Of Typical High Pressure Turbine Airfoils"; Proceedings of ASME Turbo Expo 2014; 2014.

Ferreira and Arts, Tony, von Karman Institute for Fluid Dynamics; "Influence Of Gas-to-wall Temperature Ratio On By-pass Transition"; Proceedings of ASME Turbo Expo 2017; 2017.

Vasilakppoulos, et al., von Karman Institute for Fluid Dynamics, "Investigation of Thermal Effect on By-Pass Transition on a High-Pressure Turbine Guide Vane"; ASME Turbo Expo 2018 Abstract; 2018.

Casey, John P., King, Paul I., and Sondergaard, Rolf, Air Force Research Laboratory; "Parameterization of Boundary Layer Control Dimples on a Low Pressure Turbine Blade"; Paper No. AIAA 2004-3570; 40th AIAA/ASME/SAE/ASEE Joint Propulsion Conference and Exhibit; Jul. 2004; Fort Lauderdale, Florida.

* cited by examiner

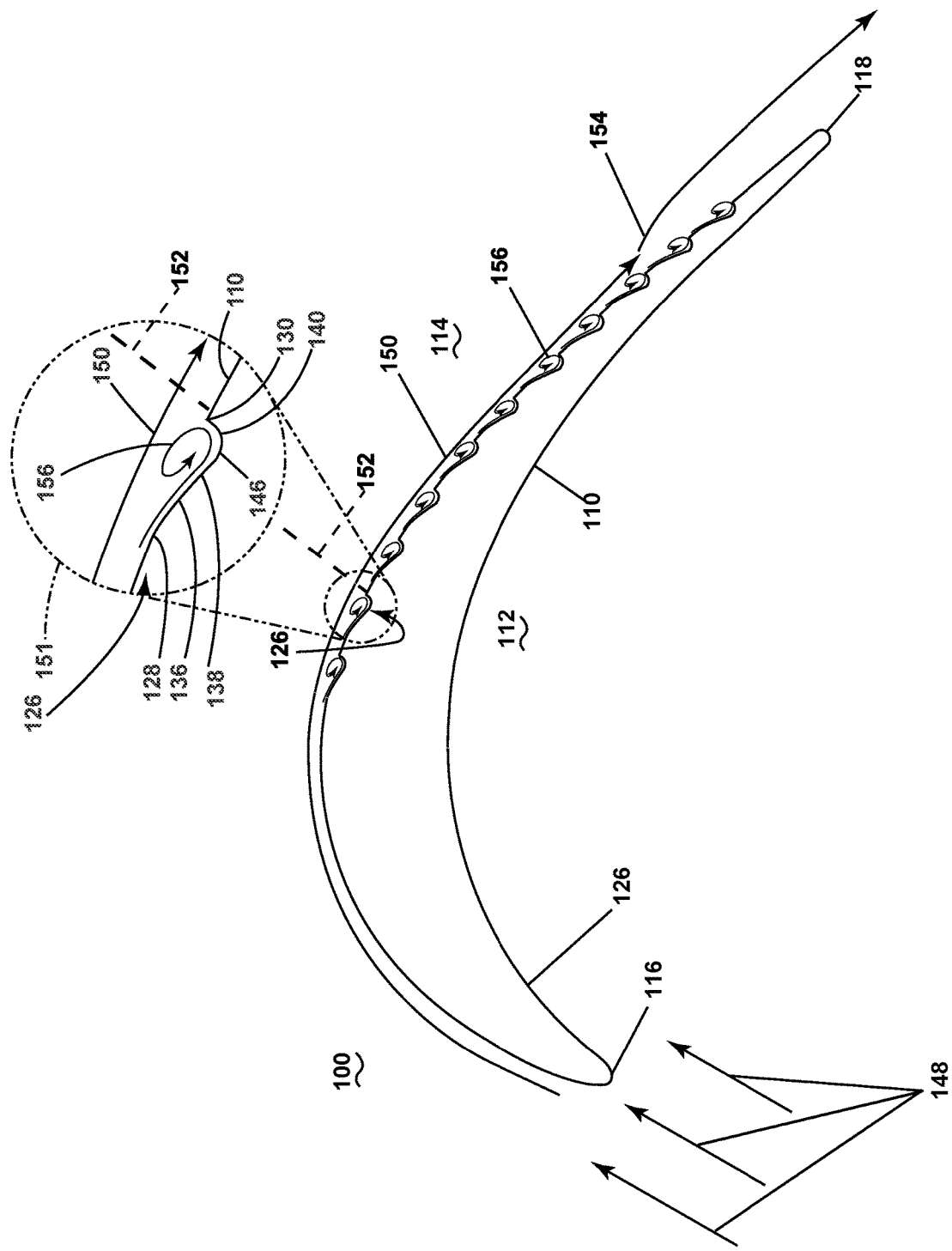

TURBINE ENGINE WITH AN AIRFOIL HAVING A SET OF DIMPLES

CROSS REFERENCE TO RELATED APPLICATIONS

This application takes priority to Italian Patent Application Serial No. 102021000000296, filed Jan. 8, 2021.

TECHNICAL FIELD

This disclosure generally relates to an airfoil for a gas turbine engine, and more specifically to a set of dimples of the airfoil.

BACKGROUND

Turbine engines, and particularly gas or combustion turbine engines, are rotary engines that extract energy from a flow of combusted gases passing through the engine onto a multitude of compressor and turbine stages, with each stage typically including a complementary set of rotating blades and stationary vanes. Turbine engines include several components that utilize airfoils. By way of a non-limiting example, the airfoils can be located in the engine turbines, compressors, or fans. Airfoils can be defined by an outer wall defining a pressure side and a suction side extending between a leading edge and a trailing edge to define a stream-wise direction, and between a root and a tip to define a span-wise direction.

During operation, an airflow can flow over the outer wall of the airfoil in the stream-wise direction from the leading edge toward the trailing edge to define a streamline. On the suction side, the streamline will follow the contour of the airfoil until it separates from the outer wall of the airfoil defining a boundary layer growth. The sooner the boundary layer growth occurs on the suction side of the airfoil, the lower the overall efficiency of the gas turbine engine.

BRIEF DESCRIPTION

In one aspect the disclosure relates to a gas turbine engine comprising a set of circumferentially adjacent airfoils, the airfoils having an outer wall defining a pressure side and a suction side extending between a leading edge and a trailing edge to define a stream-wise direction, and between a root and a tip to define a span-wise direction, and a set of dimples provided on the outer wall of at least one of the airfoils, with the dimples spaced in at least one of the stream-wise and or span-wise direction, and the dimples having a non-perforated section in a shape defining a two-dimensional surface area that when viewed in planform, the two-dimensional surface area decreases in the stream-wise direction.

In another aspect the disclosure relates to an airfoil comprising an outer wall defining a pressure side and a suction side extending between a leading edge and a trailing edge to define a stream-wise direction, and between a root and a tip to define a span-wise direction, and a set of dimples provided on the outer wall, with the dimples spaced in at least one of the stream-wise or span-wise direction, and the dimples having a non-perforated section in a shape defining a two-dimensional surface area that when viewed in planform, the two-dimensional surface area decreases in the stream-wise direction.

BRIEF DESCRIPTION OF THE DRAWINGS

A full and enabling disclosure of the present description, including the best mode thereof, directed to one of ordinary skill in the art, is set forth in the specification, which refers to the appended FIGS., in which:

FIG. 6A is a sectional view of the airfoil of FIG. 2 taken from cut IV-IV, further illustrating a streamline and a boundary layer growth.

DETAILED DESCRIPTION

Figure 1:
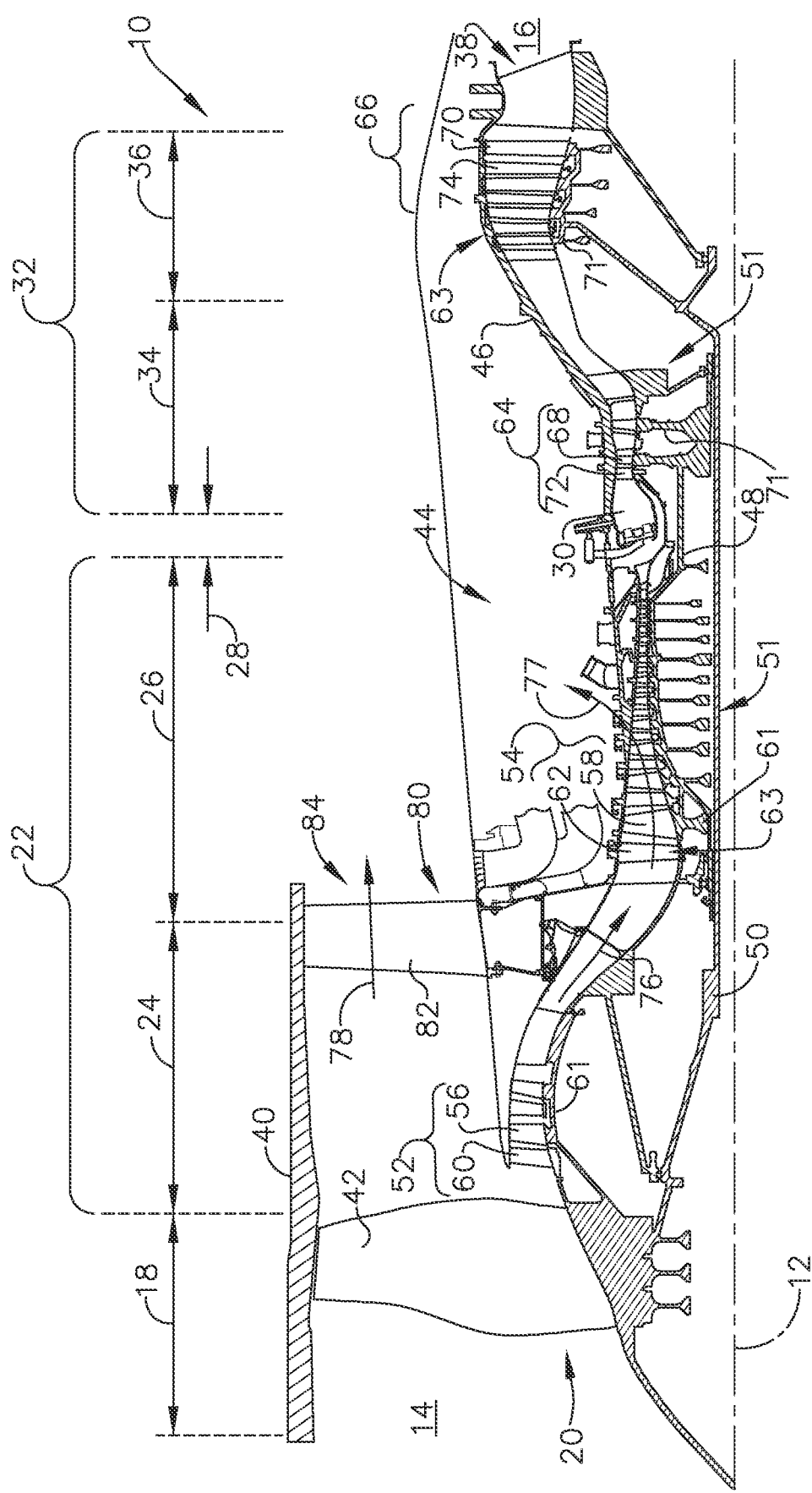
FIG. 1 is a schematic cross-sectional diagram of a gas turbine engine for an aircraft.

Aspects of the disclosure described herein are directed a set of airfoils for a gas turbine engine. The airfoils include an outer wall defining a pressure side and a suction side extending between a leading edge and a trailing edge to define a stream-wise direction, and between a root and a tip to define a span-wise direction. The airfoils can further include a set of dimples provided along a portion of the outer wall on the suction side of a corresponding airfoil. The dimples can extend from a leading edge to a trailing edge in the stream-wise direction and be spaced in at least one of the stream-wise or span-wise direction. Specifically, the dimples can be arranged in rows in the stream-wise direction or columns in the span-wise direction along the outer wall of the airfoil. It will be appreciated that the dimples can be defined by a two-dimensional surface area when viewed in planform that can be formed according to various geometries such as, but not limited to, a triangular two-dimensional surface area, a trapezoidal two-dimensional surface area, a hexagonal two-dimensional surface area, or any other suitable two-dimensional surface area. The dimples can include a first non-perforated section that increases in depth in the stream-wise direction from the leading edge of the dimples to a maximum depth, and a second non-perforated section that decreases in depth from the maximum depth to the trailing edge of the dimples.

To reduce the boundary layer growth during operation of the gas turbine engine, the dimples are shaped to generate vortices within the suction side boundary layer. These features counteract the formation of a laminar separation after a throat of the airfoil, thus preventing the separation and boundary layer growth by keeping the flow attached to the surfaced for a greater amount of the airfoil when compared to conventional airfoils without the set of dimples. In other words, the dimples, which generate the vortices, can be used to reduce the effects of the boundary layer growth by avoiding laminar separations on the suction side of the airfoil before reaching the trailing edge. This, in turn, ultimately reduces the total boundary layer growth or a boundary layer thickness, which can result in an increased aerodynamic efficiency of the airfoils within the gas turbine engine. This can ultimately result in an increased power output and efficiency of the gas turbine engine when compared to conventional gas turbine engines that do not include a set of airfoils including the set of dimples.

For the purposes of illustration, one exemplary component will be described in the form of a gas turbine engine having a set of airfoils including an outer wall and a set of dimples received on at least a portion of the suctions side of the outer wall. Such a gas turbine engine can be in the form of a gas turbine engine, a turboprop, a turboshaft, a turbofan engine, or a counter rotating turbine (e.g., a gas turbine including an inner and outer rotor in at least a section of the gas turbine engine) in non-limiting examples. It will be understood, however, that aspects of the disclosure described herein are not so limited and can have general applicability with other turbine engine components or within other engine systems. For example, the disclosure can have applicability for systems in other engines or vehicles, and may be used to provide benefits in industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The gas turbine engine 10 has a generally longitudinally extending axis or engine centerline 12 extending forward 14 to aft 16. The gas turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a set of fan blades 42 disposed radially about the engine centerline 12. The HP compressor 26, the combustor 30, and the HP turbine 34 form an engine core 44 of the gas turbine engine 10, which generates combustion gases. The engine core 44 is surrounded by core casing 46, which can be coupled with the fan casing 40.

A HP shaft or spool 48 disposed coaxially about the engine centerline 12 of the gas turbine engine 10 drivingly connects the HP turbine 34 to the HP compressor 26. A LP shaft or spool 50, which is disposed coaxially about the engine centerline 12 of the gas turbine engine 10 within the larger diameter annular HP spool 48, drivingly connects the LP turbine 36 to the LP compressor 24 and fan 20. The spools 48, 50 are rotatable about the engine centerline 12 and couple to a set of rotatable elements, which can collectively define a rotor 51.

The LP compressor 24 and the HP compressor 26 respectively include a set of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the engine centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the gas turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the gas turbine engine 10.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the gas turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the gas turbine engine 10 through a stationary vane row, and more particularly an outlet guide vane assembly 80, comprising a set of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the gas turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
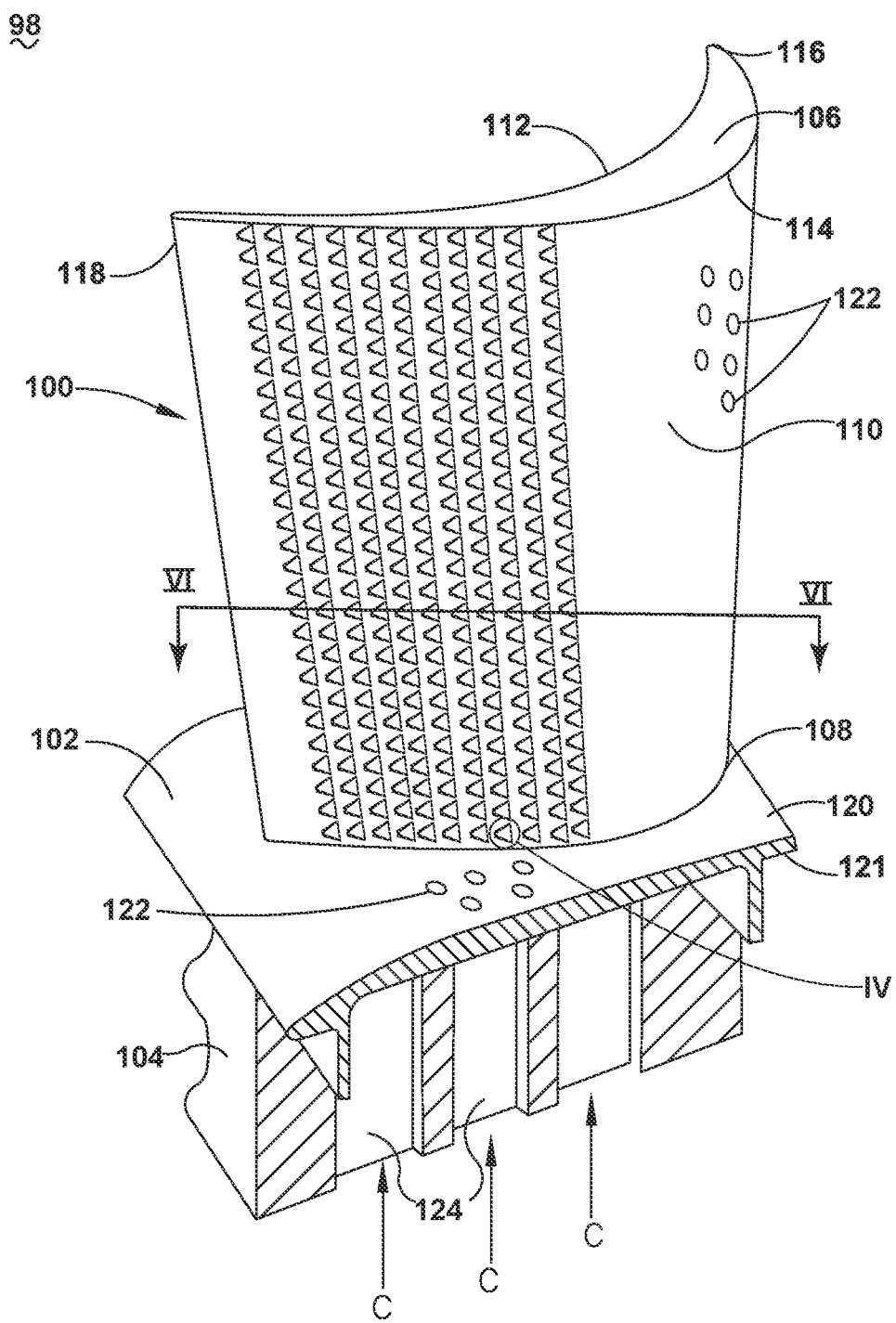
FIG. 2 is a is a perspective view of an airfoil assembly of the gas turbine engine of FIG. 1 having an airfoil defined by a pressure side and a suction side, with a set of dimples provided along a portion of the suction side.

As a non-limiting example, FIG. 2 is a perspective view of an airfoil assembly 98 received within a portion of the gas turbine engine 10 of FIG. 1. The airfoil assembly 98 can include an airfoil 100 extending from a platform 102, with a dovetail 104 depending from the platform 102. It will be appreciated that the airfoil assembly 98 can be provided in any suitable portion of the gas turbine engine 10 such as, but not limited to, the compressor section 22 or the turbine section 32.

The airfoil 100 extends from a root 108 to a tip 106 to define a span-wise direction. The airfoil 100 includes an outer wall 110 defining the periphery of the airfoil 100, which can be functionally divided into a pressure side 112 and a suction side 114, demarcated by a leading edge 116 and a trailing edge 118. The airfoil 100 can extend between the leading edge 116 and the trailing edge 118 to define a stream-wise direction. Specifically, a line joining the leading edge 116 to the trailing edge 118, equidistant from the pressure side 112 and suction side 114 of the outer wall 110 of the airfoils, can define the stream-wise direction. The stream-wise direction may or may not be parallel to the rotational or engine centerline 12 of the gas turbine engine 10.

The airfoil 100 mounts to the platform 102 at the root 108. The platform can be an annual band extending around the entirety of the engine centerline 12. A first platform surface 120 can define a surface of the platform 102 in which the airfoil 100 is mounted to at the root 108. A second platform surface 121 can define a surface of the platform 102 that opposite the first platform surface 120. It will be appreciated that depending on where the airfoil assembly 98 is mounted, the first and second platform surfaces 120, 121 can be further defined by their radial distance to the engine centerline 12. For example, if the airfoil assembly 98 is provided on the rotor 51 such that the airfoil 100 is defined as one of the turbine blades 68, then the second platform surface can be defined to be radially closer to the engine centerline 12 than the first platform surface 120. Conversely, if the airfoil assembly 98 is provided within the gas turbine engine 10 such that the airfoil 100 is defined as at least one of the static turbine vanes 72, then the first platform surface 120 can be defined to be radially closer to the engine centerline 12 than the second platform surface.

A set of cooling holes 122 can be formed in any wall of the component including the outer wall 110 or the platform 102 as illustrated. The set of cooling holes 122 can be referencing a single cooling hole or multiple cooling holes. The set of cooling holes 122 can be located by way of non-limiting example, proximate the leading edge 116, the trailing edge 118 and be located in the platform 102 on the suction side or the pressure side 112 of the airfoil 100. It should be understood that the locations of the set of cooling holes 122 is for illustrative purposes only and not mean to be limiting.

The dovetail 104 can extend from the platform 102 opposite of the airfoil 100, and can be configured to mount to the any one or more of the platforms, discs, or rotors in the compressor section 22 or turbine section 32 of the gas turbine engine 10. The dovetail 104 can include a set of inlet passages 124, illustrated as three inlet passages 124. It is contemplated that the inlet passages 124 are fluidly coupled to the set of cooling holes 122 to provide a cooling fluid flow (C) for cooling the platform 102. In another non-limiting example, the inlet passages 124 can provide the cooling fluid flow (C) to an interior of the airfoil 100 for cooling of the airfoil 100. It should be appreciated that the dovetail 104 is shown in cross-section, such that the inlet passages 124 are housed within the body of the dovetail 104.

At least a portion of the outer wall 110 of the suction side 114 can include a set of dimples 126 arranged in rows extending in the stream-wise direction and columns extending in the span-wise direction. As illustrated, the rows and columns can be parallel to each other, however, it will be appreciated that at least one row or column can be staggered with respect to the others. As such, one or more rows of the set of dimples 126 can begin further upstream or downstream than the rest of the rows of the set of dimples 126. Similarly, one or more columns of the set of dimples 126 can begin farther radially outward or inward from the root 108 than the rest of the columns. It will be yet further appreciated that each row and column can include the same total number of dimples 126. It is contemplated, however, that at least one of the rows or columns can include a differing number of dimples 126 than the other rows or columns.

The airfoil 100 including the set of dimples 126 as described herein can be provided within any suitable portion of the gas turbine engine 10 such as, but not limited to, the fan section 18, the compressor section 22, the combustion section 28, the turbine section 32 or within an bypass duct a duct including at least a portion of the air supplied by the fan 20 that can bypass the engine core 44 and be used for cooling of portions, especially hot portions, of the gas turbine engine 10), or any other suitable component. Specifically, the airfoil 100 including the set of dimples 126 can be provided within the LP turbine 36. It will be further appreciated that while the description herein is related to the airfoil 100, it can have equal applicability in other engine components that include the set of dimples 126. Some non-limiting examples of the engine component having including the set of dimples 126 can include the set of compressor blades 56, 58, the set of turbine blades 68, 70, the set of compressor vanes 60, 62, the set of turbine vanes 72, 74, the set of fan blades 42, the set of outlet guide vanes 82, a set of inlet guide vanes, a combustor liner, a combustor deflector, a shroud assembly, a guide vane within the air bypass duct, or any other suitable component of the gas turbine engine 10.

Figure 3:
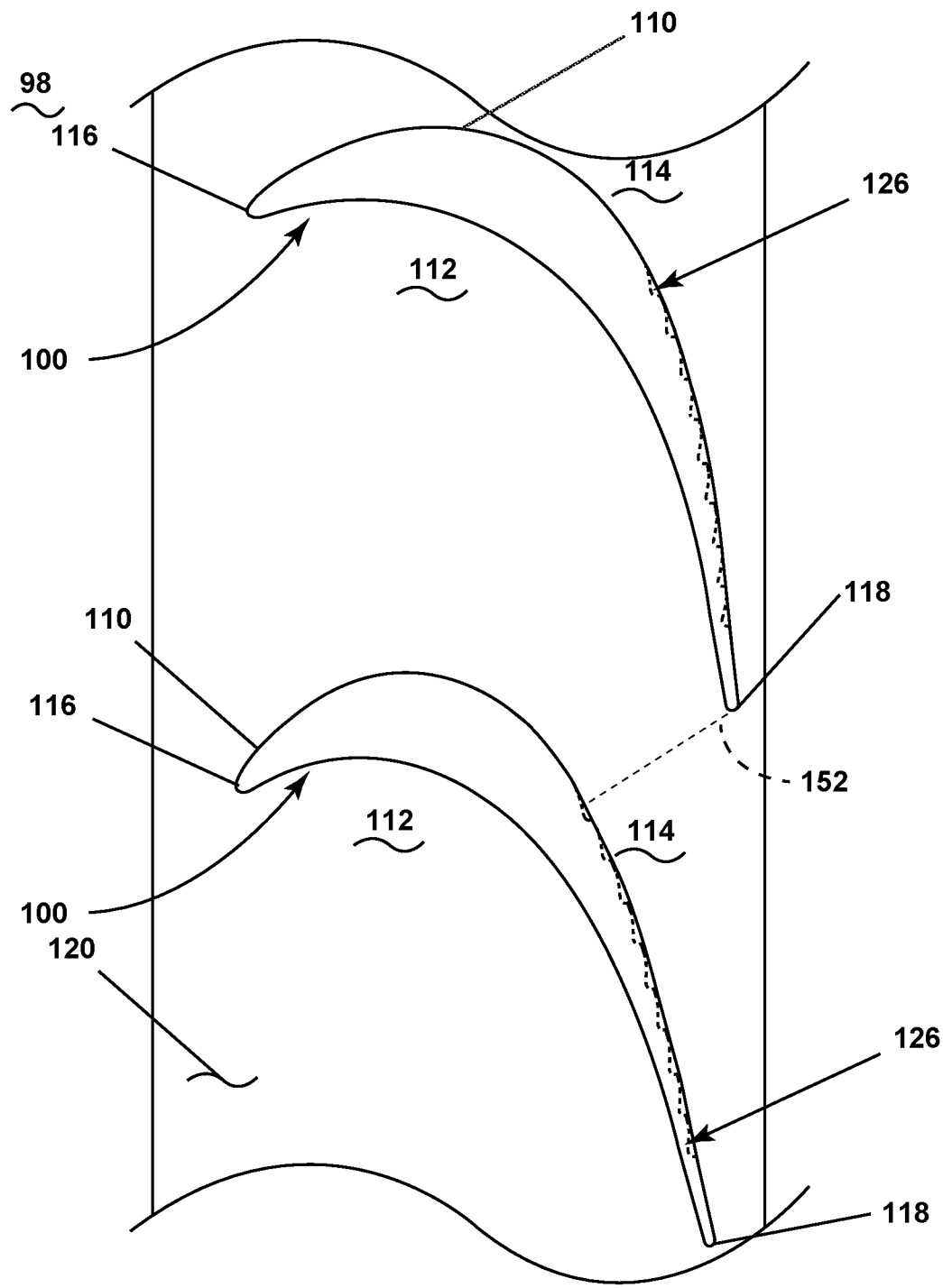
FIG. 3 is a schematic top-down view of the airfoil assembly of FIG. 2, illustrating a pair of circumferentially adjacent airfoils.

FIG. 3 is a schematic top-down view of the airfoil assembly 98 of FIG. 2 including a set of circumferentially adjacent airfoils 100, specifically a pair of circumferentially adjacent airfoils 100 extending from the first platform surface 120 of the platform 102. Although the airfoil assembly 98 is illustrated as including two airfoils 100 that are circumferentially adjacent one another, it will be appreciated that there can be any number of one or more circumferentially adjacent airfoils 100.

A throat 152 can be defined by the minimum distance between the pair of circumferentially-adjacent airfoils 100 within the gas turbine engine 10. Specifically, the throat 152 can be between the outer wall 110 of one of the airfoils 100 and the trailing edge 118 of the other airfoil 100, as illustrated.

As illustrated, both of the airfoils 100 can include the set of dimples 126 provided along a portion of the outer wall 110 on the suction side 114 of each respective airfoil 100. It will be appreciated that each airfoil 100 of the airfoil assembly 98 can include the set of dimples 126 provided a length along the outer wall 110 on the suction side 114 of each corresponding airfoil 100. Alternatively, it is contemplated that any number of one or more airfoils 100 of the airfoil assembly 98 can include the set of dimples 126.

Figure 4:
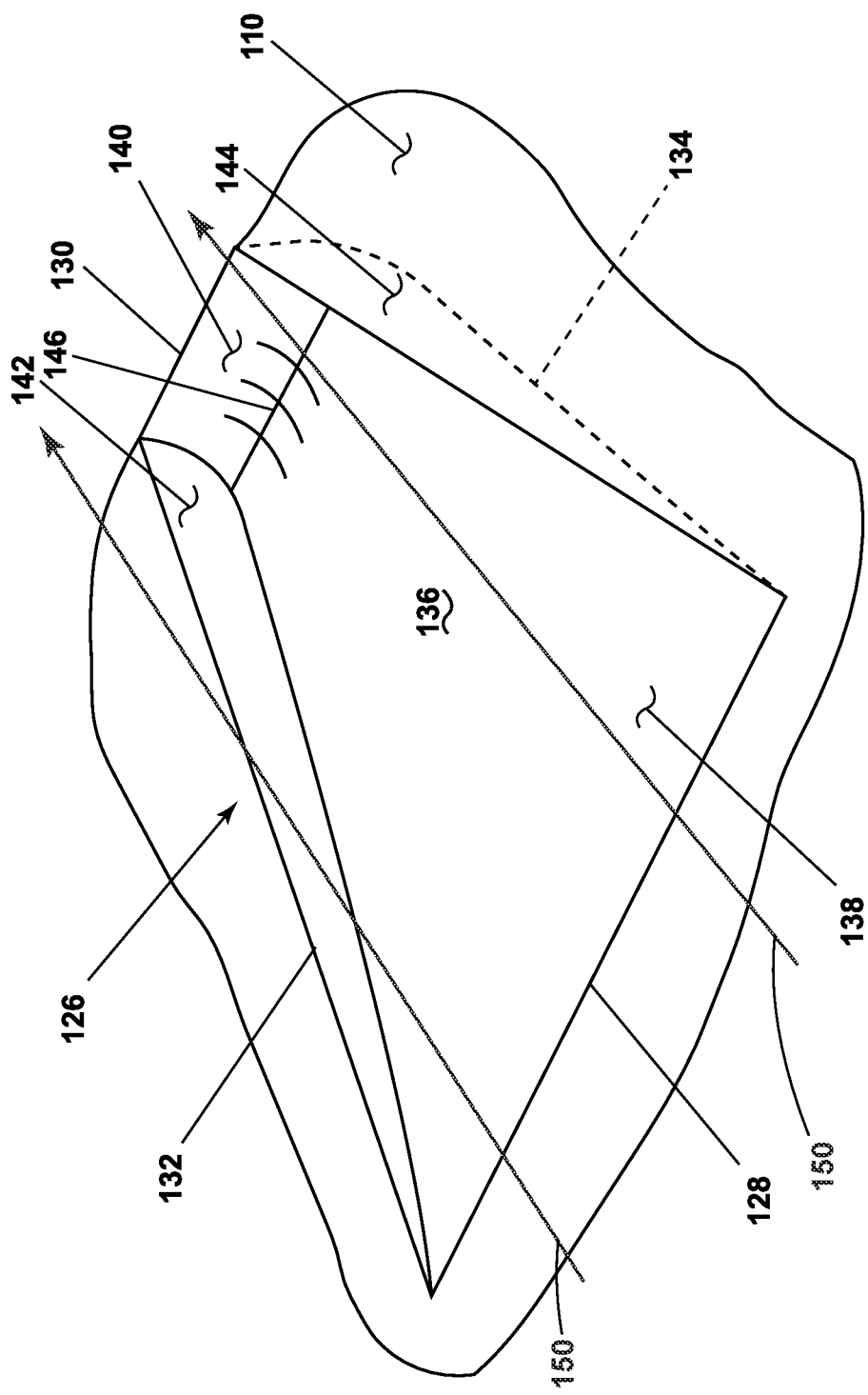
FIG. 4 is a perspective view of a dimple of the set of dimples of FIG. 2 having a trapezoidal two-dimensional surface area when viewed in planform.

FIG. 4 illustrates a dimple 126 taken from view IV-IV of FIG. 2. It will be appreciated that although described in terms of the dimple 126, that the description of the dimple 126 can be applied to any dimple in the set of dimples 126 provided along the suction side 114 of the airfoil 100.

As illustrated, the dimple 126 can be included on a portion of the airfoil 100 exposed to a working airflow, specifically a streamline 150 that extends in the stream-wise direction. The dimple 126 can include a leading edge 128 and a trailing edge 130, downstream of the leading edge 128 in the stream-wise direction, with the streamline 150 extending between the leading edge 128 and the trailing edge 130. The leading edge 128 and the trailing edge 130 of the dimple can be joined by a first lateral edge 132 and a second lateral edge 134 provided on opposing span-wise portions of the dimple 126. As illustrated, but not necessary, the first and second lateral edges 132, 134 can be mirrored-images of one another in the streamwise direction such that they can extend between the leading edge 128 and the trailing edge 130 at the same rate.

The dimple 126 can extend below a surface of the airfoil 100 defined by the contour of the outer wall 110 of the airfoil 100. The portion of the dimple 126 that extends below the surface can define a non-perforated section 136 that extends from the leading edge 128 to the trailing edge 130 and between the first and second lateral edges 132, 134. As used herein, the term "non-perforated" can refer to a section of the airfoil 100, specifically the dimples 126, that does not include a through hole (e.g., cooling hole 122, film hole, etc.) that leads into an internal portion of the airfoil 100 or platform 102. In other words, the non-perforated section 136 does not include perforations and is formed as a solid, continuous section of the outer wall 110. The non-perforated section 136 can define a first bottom wall 138, a second bottom wall 140, a first lateral wall 142, and a second lateral wall 144. The first and second lateral walls 142, 144 can each extend from the first or second bottom walls 138, 140 to the first and second lateral edges 132, 134, respectively. The first and second bottom walls 138, 140, however, can extend between the leading edge 128 to the trailing edge 130 in the stream-wise direction. It is contemplated that the first and second bottom walls 138, 140 can each vary in depth in the stream-wise direction. Specifically, the first bottom wall 138 can extend from the leading edge 128 to a maximum depth 146, and the second bottom wall 140 can extend from the maximum depth 146 to the trailing edge 130. As such, the non-perforated section 136 can define a depth of the dimple 126, which first increases from the leading edge 128 to the maximum depth 146 and then decrease from the maximum depth 146 to the trailing edge 130. It will be appreciated that the maximum depth 146 can extend across the entire span-wise length of the dimple 126. Alternatively, the maximum depth 146 can be defined by a single point within a portion of the non-perforated section 136.

It is contemplated that the first bottom wall 138 can continuously increase in depth from the leading edge 128 to the maximum depth 146. As such, the first bottom wall 138 of the non-perforated section 136 can be defined as a continuously decreasing, or linearly decreasing section of the non-perforated section 136. Alternatively, at least a portion of the first bottom wall 138 can be non-continuous, or non-linear. For example, the first bottom wall 138 can define a curved cross section when viewed in the span-wise direction. Alternatively, the first bottom wall 138 can be formed as a step function such that the second bottom wall 140 can include a sudden or instantaneous decrease in depth in the span-wise direction.

It is contemplated that the second bottom wall 140 can define a curved cross section when viewed in the span-wise direction. In other words, the second bottom wall 140 can non-continuously, or non-linearly extend from the maximum depth 146 to the trailing edge 130. As such, the second bottom wall 140 of the non-perforated section 136 can be defined as a non-continuously increasing, or non-linearly increasing section of the non-perforated section 136. As illustrated, the second bottom wall 140 can define an exponential curve increasing from the maximum depth 146 to the trailing edge 130. Alternatively, at least a portion of the second bottom wall 140 can be continuous or linearly decreasing in depth from the maximum depth 146 to the trailing edge 130.

The first and second lateral walls 142, 144 of the non-perforated section 136 can each be normal to the span-wise direction. Alternatively, at least a portion of the first and second lateral walls 142, 144 can decrease in depth, continuously, linearly, non-continuously or non-linearly, from a corresponding portion of the first or second bottom wall 140, 140 to the first or second lateral edges 132, 134, respectively.

Figure 5:
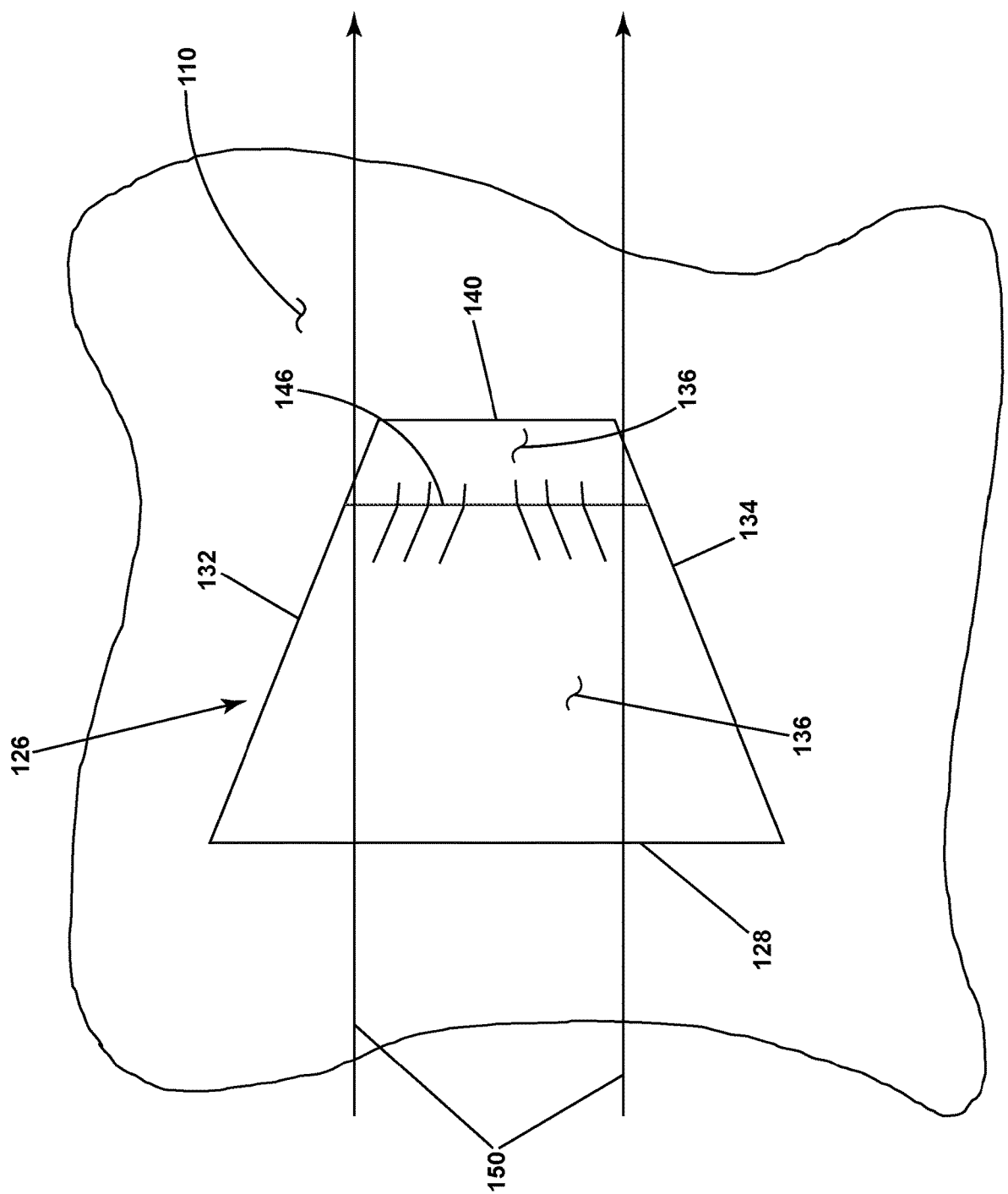
FIG. 5 is a planform view of the dimple of FIG. 3, illustrating a two-dimensional surface area of the dimple.

FIG. 5 is a planform view of the dimple 126 of FIG. 4 illustrating a two-dimensional surface area of the dimple 126 demarcated by the leading edge 128, the trailing edge 130, the first lateral edge 132, and the second lateral edge 134.

It is contemplated that the first and second bottom walls 138, 140 can each be defined by non-equal lengths in the stream-wise direction. Specifically, the length of the first bottom wall 138 can be larger than the length of the second bottom wall 140. As such, the maximum depth 146 can be provided at a portion of the dimple 126 that is greater than 50% of the total length in the stream-wise direction. Specifically, the maximum depth 146 can be provided between 50% or greater than 50% and less than 100% of the stream-wise length of the dimple 126. It is contemplated, however, that the maximum depth 146 can be provided along a portion of the stream-wise length of the dimple that is greater than 50% of the stream-wise length. In other words, the maximum depth 146 can be provided downstream a midpoint of the dimple 126 in the stream-wise direction. Alternatively, the maximum depth 146 can be provided along any portion of the stream-wise length of the dimple 126. It will be yet further appreciated that the depth of the maximum depth 146 can be between 2% and 50% of the stream-wise length of the dimple 126.

The non-perforated section 136 of the dimple 126 can define the two-dimensional surface area, specifically a trapezoidal two-dimensional surface area. As illustrated, the first and second lateral edges 132, 134 can be angled such that they converge from the leading edge 128 toward the trailing edge 130. In other words, the two-dimensional surface area can decrease in the stream-wise direction. Specifically, the two-dimensional surface area can decrease from the leading edge 128 to the trailing edge 130.

Figure 6B:
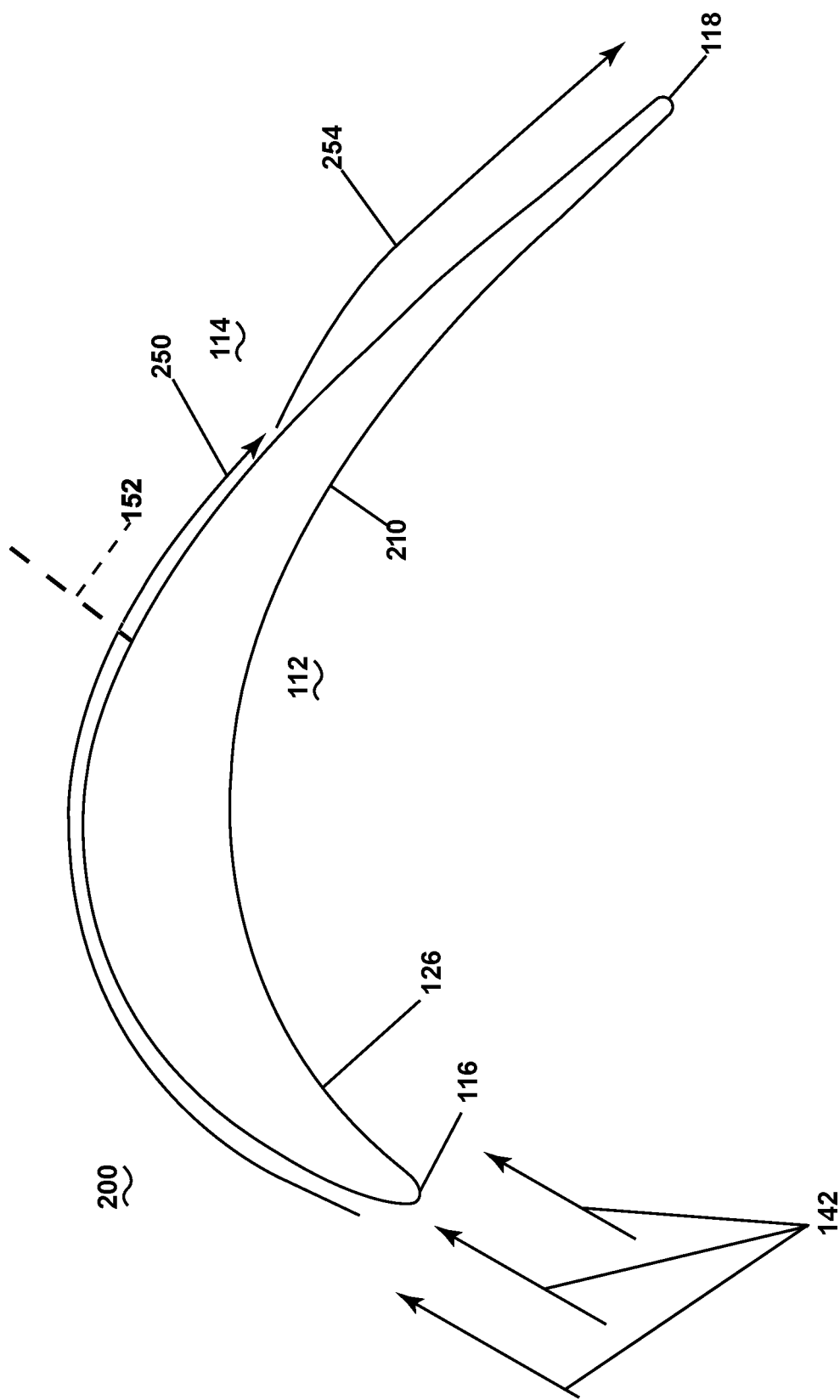
FIG. 6B is a sectional view of an exemplary airfoil taken from cut IV-IV of FIG. 2, the exemplary airfoil not include the set of dimples and further illustrating the streamline and the boundary layer growth.

FIGS. 6A-6B illustrates a non-limiting example of the airfoil 100 and an exemplary airfoil 200, with the airfoil 200 being similar to the airfoil 100, however, the airfoil 200 does not include the set of dimples 126. The airfoil 200 is similar to the airfoil 100; therefore, like parts will be identified with like numerals in the 200 series, with it being understood that the description of the like parts of the airfoil 100 applies to the airfoil 200 unless otherwise noted. FIGS. 6A-6B illustrate a comparison between the two airfoils 100, 200, specifically FIGS. 6A-6B illustrate the streamline 150 flowing over a portion of the airfoil 100, 200 until it separates from the airfoil 100, 200 to define a boundary layer growth 154, 254, respectively, with the boundary layer growth 254 of the airfoil 200 beginning sooner along the airfoil 200, and thus being larger than the boundary layer growth 154 of the airfoil 100.

By way of non-limiting example, FIG. 6A illustrates a sectional view of the airfoil 100 taken along sight line IV-IV of FIG. 2, further illustrating an airflow 148 defining a suction side 114 streamline 150 that flows over the outer wall 110 of the airfoil 100 from the leading edge 116 toward the trailing edge 118. The airflow 148 can be any suitable airflow 148 within the gas turbine engine 10. For example, the airflow 148 can be a working airflow within the gas turbine engine 10 configured to be drawn in through (e.g., within the fan section 18, compressed by (e.g., within the compressor section 22), combusted within (e.g. within the combustion section 28), rotate (e.g., within the turbine section 32), or otherwise be exhausted through (e.g., within the exhaust section 38) at least a section of the gas turbine engine 10. Alternatively, the airflow 148 can be a bypass airflow within the bypass duct of the gas turbine engine 10.

As discussed herein, the airfoil 100 can be included within a set of circumferentially adjacent airfoils 100 and the throat 152 can be defined between circumferentially-adjacent airfoils 100. As illustrated, at least one row of the set of dimples 126 can begin upstream the throat 152. Additionally, or alternatively, at least one row of the set of dimples 126 can be provided along a portion of the outer wall 110 at or downstream the throat 152.

As illustrated, the set of dimples 126 can end proximate the trailing edge 118 of the airfoil 100. As such, the total amount of the airfoil 100 that includes the set of dimples 126 can be between 30% and 98% of a stream-wise length of the airfoil 100 along the outer wall 110 on the suction side 114.

FIG. 6B illustrates a sectional view of the airfoil 200 taken from cut IV-IV of FIG. 2. The airfoil 200 does not include the set of dimples 126 as the airfoil 100 does. The airflow 148 can define a suction side 114 streamline 250 that flows over the outer wall 210 of the airfoil 200 from the leading edge 116 toward the trailing edge 118.

In operation of the gas turbine engine 10, at least a portion of the airflow 148 can impinge and be separate by the leading edge 116 of the airfoil 100, 200. The portion of the airflow 148 that flows over the suction side 114 can define the streamline 150, 250, which follows a contour defined by the outer wall 110, 210 until it separates from the outer wall 110, 210 at a downstream section of the airfoil 100, 200. This separation can define a boundary layer growth 154, 254.

FIG. 6A further illustrates an enlarged view 151 of a portion of the airfoil 100. Specifically, illustrates the dimple 126 that extends in the stream-wise direction from the leading edge 128 to the trailing edge 130, and includes the non-perforated section 136 with the first bottom wall 138, which extends below a surface of the airfoil 100 from the leading edge 128 to the maximum depth 146 and a second bottom wall 140 that extends back to the surface of the airfoil 100 from the maximum depth 146 to the trailing edge 130.

The streamline 150 can flow over the dimples 126 of the airfoil 100 such that a portion of the streamline 150 can flow into the dimples 126. The portion of the streamline 150 that flows into the dimples 126 can follow the contour of the dimples 126, specifically the contour the non-perforated section 136 of the dimples 126, as illustrated. As the streamline 150 flows from the leading edge 128 to the maximum depth 146 of a corresponding dimple 126, the portion of the streamline 150 within the dimple 126 can be accelerated. This is due to the fact that the at least a portion of the first and second lateral walls 142, 144 converge from the leading edge 128 to the trailing edge 130 of the dimples 126 such that the portion of the streamline 150 within the dimples 126 is compressed and subsequently accelerated within the dimples 126. As the portion of the streamline 150 within the dimples reaches the maximum depth 146, it is redirected upwards or towards the trailing edge 130 of the dimples 126 by the second bottom wall 140 of the non-perforated section 136. This flow of the portion of the streamline 150 within the dimples 126 from the leading edge 128, over the first bottom wall 138, to the maximum depth 146, and up the second bottom wall 140 to the trailing edge 130 can define vortices 156 within the dimples 126 generated by the portion of the streamline 150 that flows through the dimples 126. The vortices 156 can be defined as Kelvin Helmholtz vortices, which directly oppose the streamline 150 flowing over the dimples 126.

In other words, the dimples 126 can be shaped to generate the vortex 156 that rotates counter or otherwise opposes to the streamline 150 flowing over the airfoil 100, and specifically the dimples 126, in the stream-wise direction. These vortices 156 can be configured to counteract the streamline 150 such that the streamline 150 is suctioned to the outer wall 110 of the airfoil 100.

It is contemplated that the boundary layer growth 154 can occur downstream of where the boundary layer growth 254 would occur. This is due to the fact that the airfoil 200 does not include the set of dimples 126 while the airfoil 100 does. As such, the vortices 156 are only generated by the airfoil 100 and not by the exemplary airfoil 200. As the vortices 156 of the airfoil 100 hold or suction the streamline 150 to the outer wall 110 of the airfoil 100, the streamline 150 does not separate from the outer wall 110 to form the boundary layer growth 154 until farther downstream than where the boundary layer growth 254 occurs. The sooner that the boundary layer growth 154, 254 occurs, the larger the total boundary layer growth 154, 254. The more boundary layer growth 154, 254 there is, the more pressure losses occur, which results in a decreased power output or torque generated by the airfoils and an overall decrease in the efficiency of the gas turbine engine 10. As the boundary layer growth 154 occurs further downstream the airfoil 100 than the boundary layer growth 254, the boundary layer growth 154 is ultimately smaller than the boundary layer growth 254. As such, the pressure losses from the leading edge 116 to the trailing edge 118 of the airfoil 100 are smaller than the pressure losses from the leading edge 116 to the trailing edge 118 of the airfoil 200. This ultimately results in the torque generated from the airfoil 100 being larger than the torque generated by the airfoil 200, which ultimately results in the gas turbine engine 10 including the airfoil 100 with the set of dimples 126 being more efficient than an exemplary gas turbine engine that does not include the airfoil 100 and only the airfoil 200.

Figure 7:
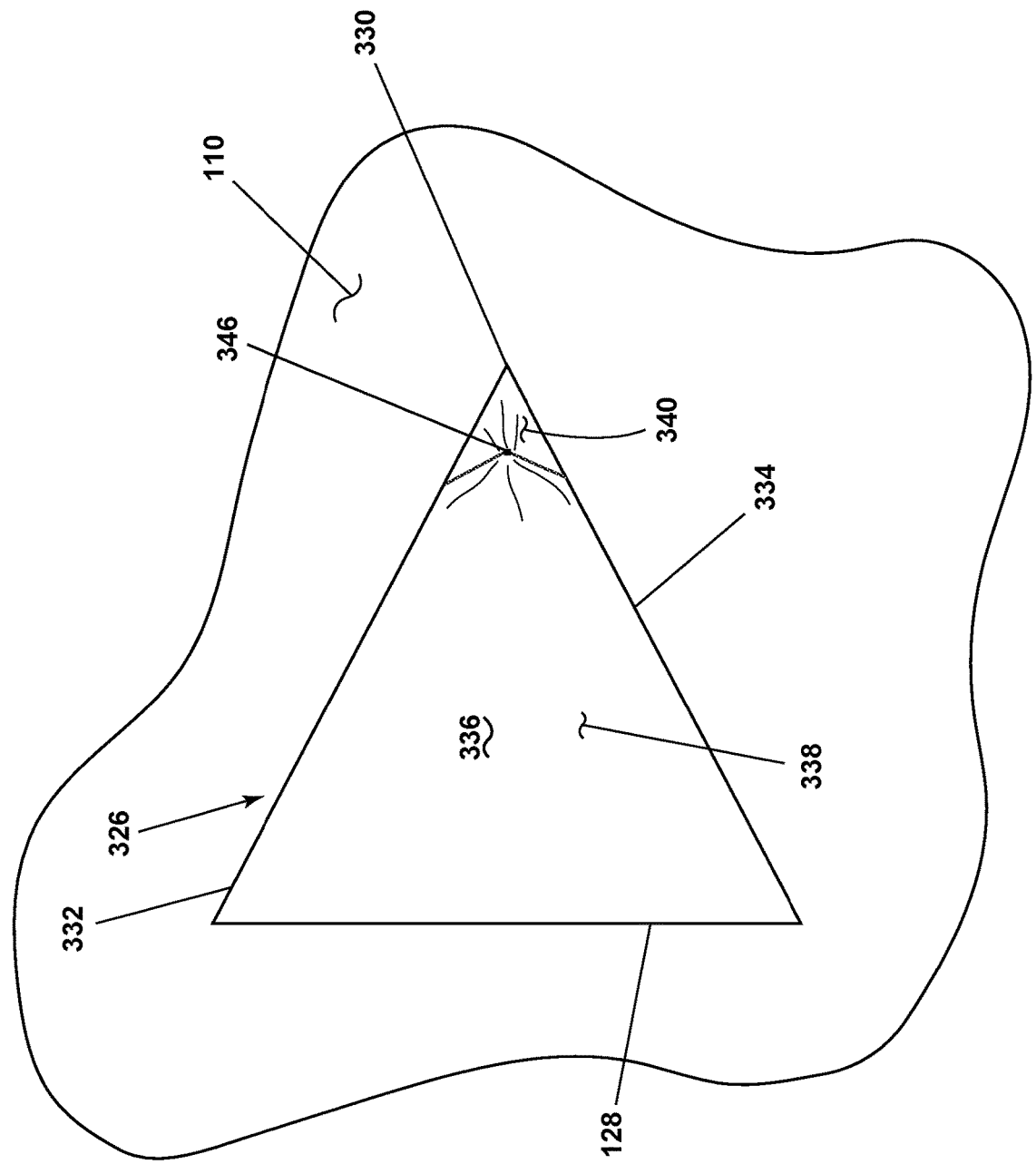
FIG. 7 is a planform view of an exemplary dimple of the set of dimples of FIG. 2, the exemplary dimple including a triangular two-dimensional surface area.

FIG. 7 is a planform view of an exemplary dimple 326 of the set of dimples 126 of FIG. 2. The dimple 326 is similar to the dimple 126; therefore, like parts will be identified with like numerals in the 300 series, with it being understood that the description of the like parts of the dimple 126 applies to the dimple 326 unless otherwise noted.

The dimple 326 can be demarcated by the leading edge 128, a trailing edge 130, a first lateral edge 332 and a second lateral edge 334. A non-perforated section 336 of the dimple 326 can include a first bottom wall 338 extending from the leading edge 128 to a maximum depth 346 and a second bottom wall 340 extending from the maximum depth 346 to the trailing edge 330. As illustrated the first and second lateral edges 332, 334 can converge to an intersection point defined by the trailing edge 330. As such, when viewed in planform, the non-perforated section 336 can define a triangular two-dimensional surface area that decreases from the leading edge 128 to a trailing edge 330 of the dimple 326.

The non-perforated section 336, similar to the non-perforated section 136, can decrease in depth from the leading edge 128 to the maximum depth 346, and increase from the maximum depth 346 toward the trailing edge 330 or to the first or second lateral edges 332, 334. As illustrated, the maximum depth 346 is defined as a point. As such, the non-perforated section 336, defined by the second bottom wall 340, can non-continuously or non-linearly decrease in depth from the point at which the maximum depth 346 occurs to the at least a portion of the first and second lateral edges 332, 334 proximate the trailing edge 330. Alternatively, the maximum depth can be formed as two lines converging from the first and second lateral edges 332, 334 toward a vertex. In such a case, the second bottom wall 340 can non-continuously, or non-linearly decrease in depth to the trailing edge 330. It will be appreciated that the maximum depth 346 can occur at any point along a span-wise length of the dimple 326. For example, the maximum depth 346 can be equidistant from between the first and second lateral edges 332, 334. Alternatively, the maximum depth 346 can be closer to one of either the first or second lateral edges 332, 334 than the other.

Figure 8:
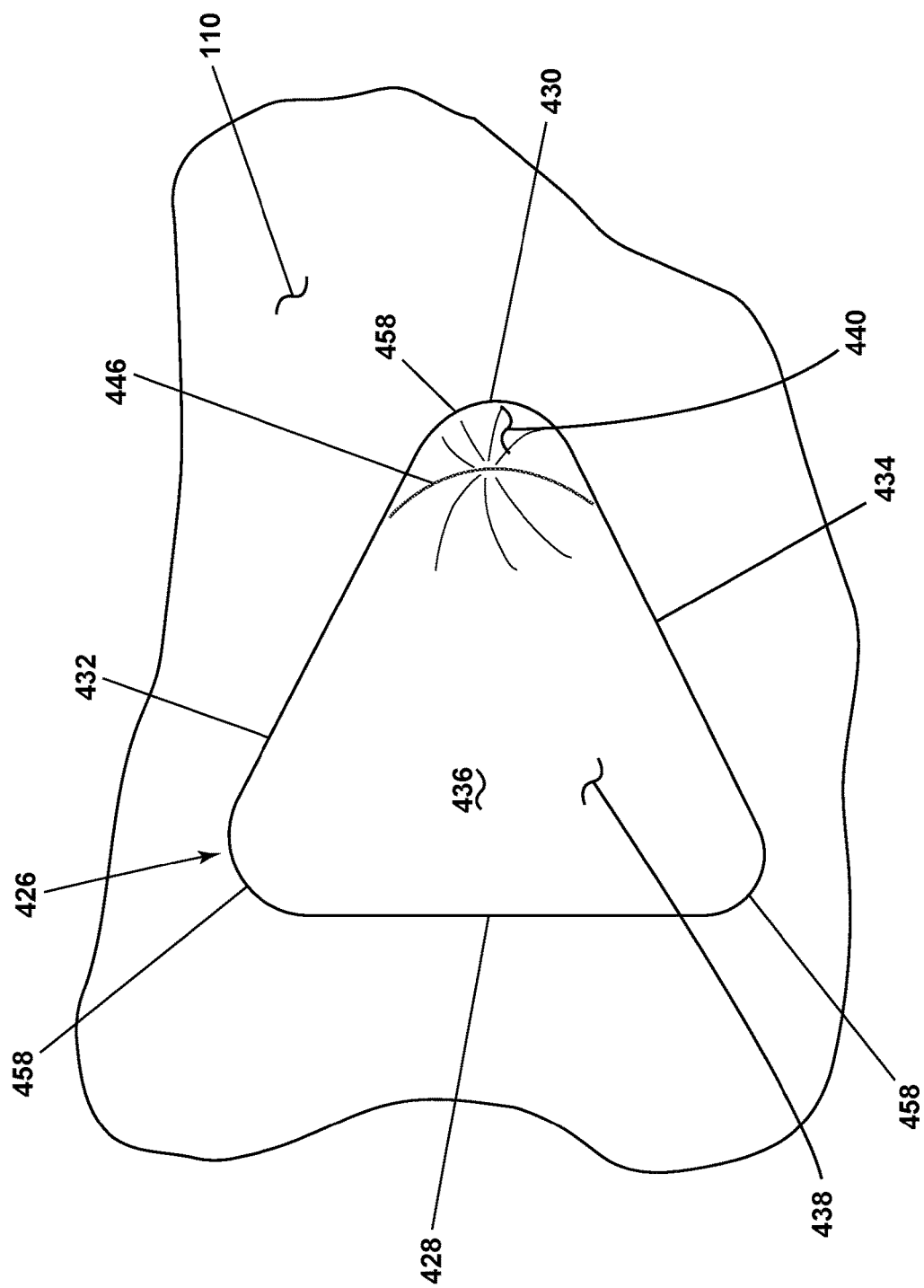
FIG. 8 is a planform view of an exemplary dimple of the set of dimples of FIG. 2, the exemplary dimple including a triangular two-dimensional surface area with rounded vertices.

FIG. 8 is a planform view of another exemplary dimple 426 of the set of dimples 126 of FIG. 2. The dimple 426 is similar to the dimple 126, 326; therefore, like parts will be identified with like numerals in the 400 series, with it being understood that the description of the like parts of the dimple 126, 326 applies to the dimple 426 unless otherwise noted.

The dimple 426 can include a leading edge 428, a trailing edge 430, a first lateral edge 432, and a second lateral edge 434. A non-perforated section 436 of the dimple 426 can include a first bottom wall 438 extending from the leading edge 428 to a maximum depth 446 and a second bottom wall 440 extending from the maximum depth 446 to the trailing edge 430. The leading edge 428 and the trailing edge 430 can each include a filleted or rounded edge 458. Specifically, the leading edge 428 can include two rounded edges 458, each opposing each other at opposites span-wise ends of the leading edge 428, that join or merge with a first lateral edge 432 and a second lateral edge 434. The first and second lateral edges 432, 434 can converge toward the rounded edges 458 of the trailing edge 430. As such, when viewed in planform, the non-perforated section 436 of the dimple 426 can define a rounded vertex, triangular two-dimensional surface area that decreases from the leading edge 428 to a trailing edge 430 of the dimple 426.

Figure 9:
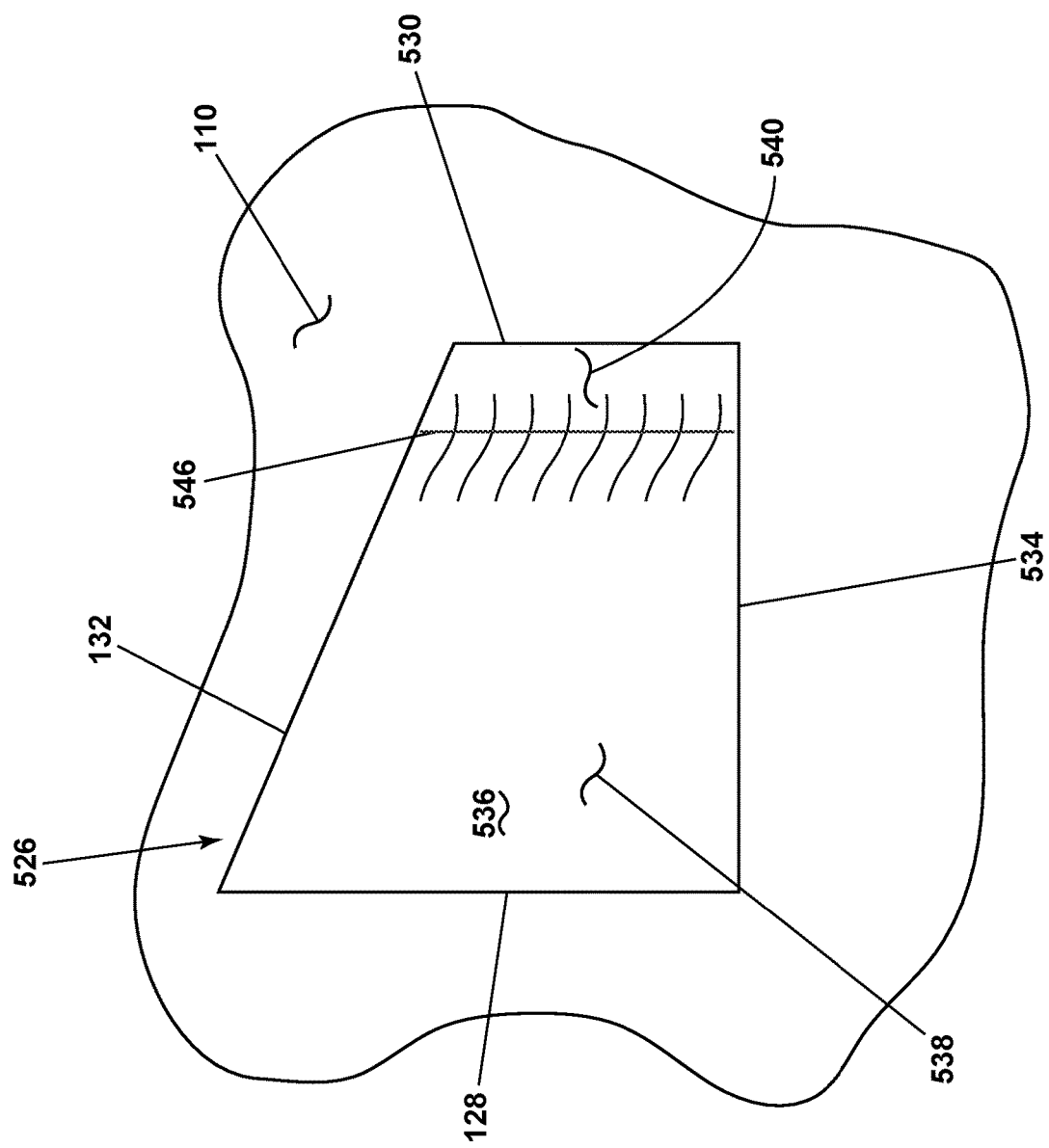
FIG. 9 is a planform view of an exemplary dimple of the set of dimples of FIG. 2, the exemplary dimple including an exemplary trapezoidal two-dimensional surface area.

FIG. 9 is a planform view of another exemplary dimple 526 of the set of dimples 126 of FIG. 2. The dimple 526 is similar to the dimple 126, 326, 426; therefore, like parts will be identified with like numerals in the 500 series, with it being understood that the description of the like parts of the dimple 126, 326, 426 applies to the dimple 526 unless otherwise noted.

The dimple 526 can include the leading edge 128, a trailing edge 530, the first lateral edge 132, and a second lateral edge 534. A non-perforated section 536 of the dimple 526 can include a first bottom wall 538 extending from the leading edge 128 to a maximum depth 546 and a second bottom wall 540 extending from the maximum depth 546 to the trailing edge 530. As illustrated, the first and second lateral edges 132, 534 can extend between the leading edge 128 and the trailing edge 530 at differing rates. Specifically, the first lateral edge 132 can be angled to converge from the leading edge 128 toward the trailing edge 530, while the second lateral edge 534 can be normal to both the leading and trailing edges 128, 530. As such, when viewed in planform, the non-perforated section 536 of the dimple 526 can define an exemplary two-dimensional surface area, specifically a non-symmetric trapezoidal two-dimensional surface area, that decreases from the leading edge 128 to the trailing edge 530 of the dimple 526.

Figure 10:
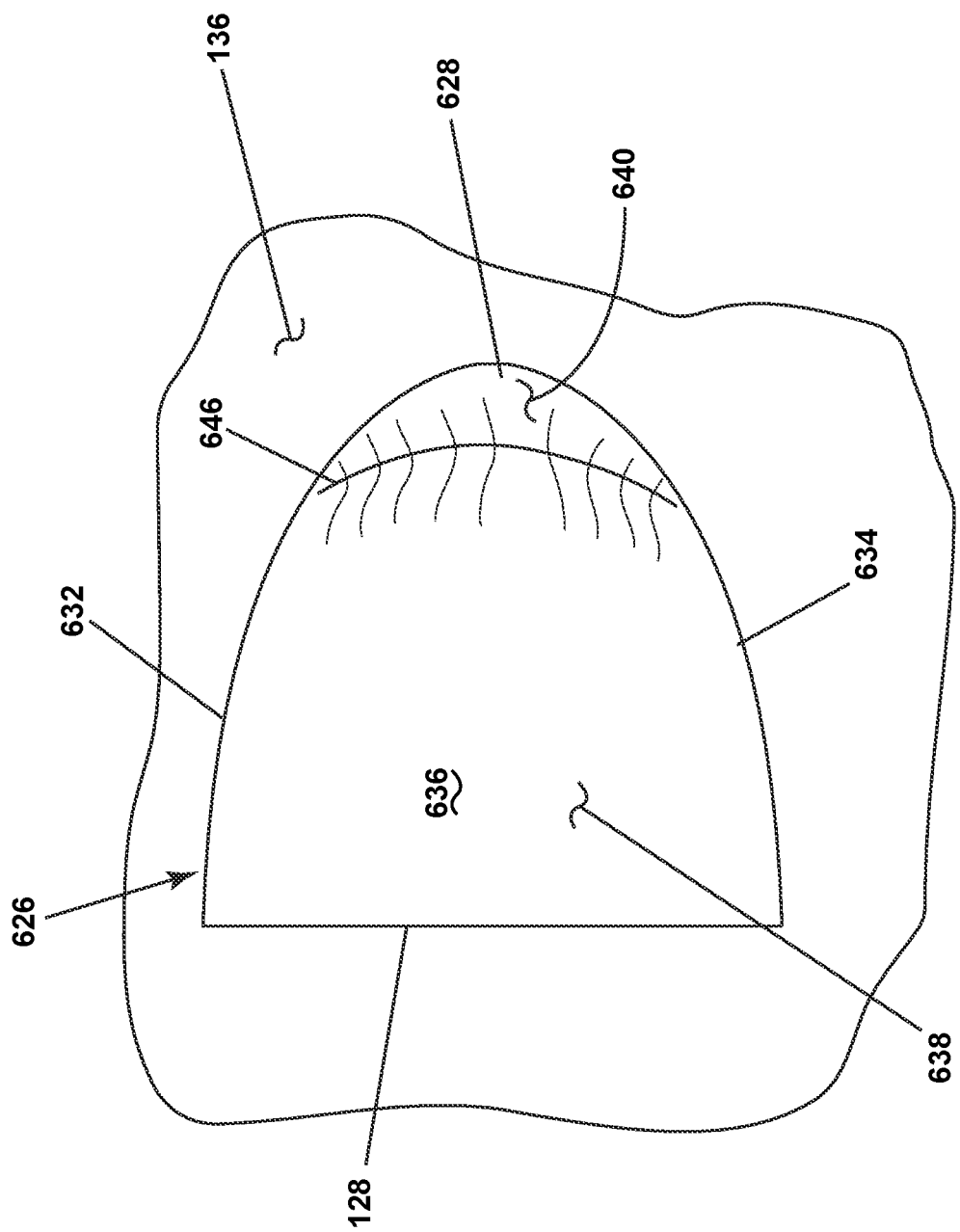
FIG. 10 is a planform view of an exemplary dimple of the set of dimples of FIG. 2, the exemplary dimple including a semi-oval two-dimensional surface area.

FIG. 10 is a planform view of another exemplary dimple 626 of the set of dimples 126 of FIG. 2. The dimple 626 is similar to the dimple 126, 326, 426, 526; therefore, like parts will be identified with like numerals in the 600 series, with it being understood that the description of the like parts of the dimple 126, 326, 426, 526 applies to the dimple 626 unless otherwise noted.

The dimple 626 can include the leading edge 128, a trailing edge 630, a first lateral edge 632, and a second lateral edge 634. A non-perforated section 636 of the dimple 626 can include a first bottom wall 638 extending from the leading edge 128 to a maximum depth 646 and a second bottom wall 640 extending from the maximum depth 646 to the trailing edge 630. As illustrated, the first and second lateral edges 632, 634 can be defined as a set of curved edges that converge from leading edge 128 toward the trailing edge 630, with the first and second lateral edges 632, 634 intersecting at the trailing edge 630. As such, when viewed in planform, the non-perforated section 636 of the dimple 626 can define a semi-oval two-dimensional surface area that decreases from the leading edge 128 to the trailing edge 630 of the dimple 626.

Benefits of the present disclosure include an increased efficiency of the gas turbine engine when compared to conventional gas turbine engines. For example, conventional gas turbine engines can include at least one engine components exposed to a fluid flow and shaped like an airfoil (e.g., airfoils in the compressor section or turbine section, fan blades, guide vanes, etc.). The fluid flow can flow over the engine components from a leading edge toward a trailing edge following a contour of an outer wall on a suction side of the engine component to define a streamline. The streamline will separate from the outer wall to define the boundary layer growth. The sooner that the boundary layer growth begins to form, the larger the total boundary layer growth there will be. This can ultimately negatively affect overall efficiency of the gas turbine engine by increasing pressure losses associated with the flow of fluid over the engine component and reducing the torque generated by the engine component. The gas turbine engine as described herein, however, include a set of airfoils including the set of dimples provided along a portion of the outer wall on the suction side of the airfoils. As discussed herein, the shape of the dimples can generate vortices that that counter-act the streamline. Specifically, the vortices can be generated by the dimples including non-perforated section, which increases in depth from the leading edge of the dimples to the maximum depth that is closer to the trailing edge than the leading edge, and then decreases in depth from the maximum depth to the trailing edge, along with the convergence of at least one of the first or second lateral edges or walls from the leading edge to the trailing edge. The vortices ensure the streamline will follow a contour defined by the outer wall for a larger stream-wise portion of the airfoil, or other engine component, when compared to the engine components in conventional gas turbine engines. As such, the pressure losses associated with the boundary layer growth are smaller in the gas turbine engine as described herein when compared to conventional gas turbine engines, and a greater torque is generated by the airfoil or engine component including the set of dimples when compared to conventional engine components. With a decrease in the boundary layer growth, a decrease in pressure losses, and an increase in torque, the overall efficiency of the gas turbine engine including the airfoils with the dimples is ultimately increased when compared to traditional gas turbine engines.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

A gas turbine engine comprising a set of circumferentially adjacent airfoils, the airfoils having an outer wall defining a pressure side and a suction side extending between a leading edge and a trailing edge to define a stream-wise direction, and between a root and a tip to define a span-wise direction, and a set of dimples provided on the outer wall of at least one of the airfoils, with the dimples spaced in at least one of the stream-wise and or span-wise direction, and the dimples having a non-perforated section in a shape defining a two-dimensional surface area that when viewed in planform, the two-dimensional surface area decreases in the stream-wise direction.

The gas turbine engine of any preceding clause, wherein the dimples are arranged in rows in the stream-wise direction, and at least one row is staggered with respect to the other rows.

The gas turbine engine of any preceding clause, wherein the dimples are arranged in columns in the span-wise direction.

The gas turbine engine of any preceding clause, wherein the non-perforated section increases in depth in the stream-wise direction.

The gas turbine engine of any preceding clause, wherein the dimples have a leading edge and a trailing edge to define a stream-wise length between the leading edge and trailing edge, and the depth first increases from the leading edge to a maximum depth and then the depth then deceases from the maximum depth to the trailing edge.

The gas turbine engine of any preceding clause, wherein the maximum depth is between greater than 50% and less than 100% of the stream-wise length.

The gas turbine engine of any preceding clause, wherein a portion of the non-perforated section from the maximum depth to the trailing edge defines a curved cross section when viewed in the span-wise direction.

The gas turbine engine of any preceding clause, wherein the depth constantly increases from the leading edge to the maximum depth.

The gas turbine engine of any preceding clause, wherein the depth constantly decreases from the maximum depth to the trailing edge.

The gas turbine engine of any preceding clause, wherein the airfoils are provided within at least a portion of at least one of a compressor section, a turbine section, a fan section, an exhaust section or a bypass duct of the gas turbine engine.

The gas turbine engine of any preceding clause, wherein the airfoils are provided within at least a portion of a low-pressure turbine of the turbine section.

The gas turbine engine of any preceding clause, wherein the dimples are shaped to generate a vortex that rotates counter to a streamline flowing over the at least one of the airfoils in the stream-wise direction.

An airfoil comprising an outer wall defining a pressure side and a suction side extending between a leading edge and a trailing edge to define a stream-wise direction, and between a root and a tip to define a span-wise direction, and a set of dimples provided on the outer wall, with the dimples spaced in at least one of the stream-wise or span-wise direction, and the dimples having a non-perforated section in a shape defining a two-dimensional surface area that when viewed in planform, the two-dimensional surface area decreases in the stream-wise direction.

The airfoil of any preceding clause, wherein the dimples are arranged in rows in the stream-wise direction, and at least one row is staggered with respect to the other rows.

The airfoil of any preceding clause, wherein the dimples are arranged in columns in the span-wise direction.

The airfoil of any preceding clause, wherein the non-perforated section constantly increases in depth in the stream-wise direction.

The airfoil of any preceding clause, wherein the dimples have a leading edge and a trailing edge to define a stream-wise length between the leading edge and trailing edge, and the depth first increases from the leading to a maximum depth and then the depth then deceases from the maximum depth to the trailing edge.

The airfoil of any preceding clause, wherein the maximum depth is between greater than 50% and less than 100% of the stream-wise length.

The airfoil of any preceding clause, wherein a portion of the non-perforated section from the maximum depth to the trailing edge defines a curved cross section when viewed in the span-wise direction.

The airfoil of any preceding clause, wherein the dimples are shaped to generate a vortex that rotates counter to a streamline flowing over the airfoil in the stream-wise direction.

What is claimed is:

1. An airfoil comprising:
    an outer wall defining a pressure side and a suction side extending between a leading edge and a trailing edge to define a stream-wise direction, and between a root and a tip to define a span-wise direction; and
    a set of dimples provided on the outer wall, with each dimple of the set of dimples having a non-perforated section including:
        a dimple leading edge;
        a dimple trailing edge provided aft of the dimple leading edge in the stream-wise direction; and
        at least one lateral edge extending between the dimple leading edge and the dimple trailing edge, the at least one lateral edge converging from the dimple leading edge and towards the dimple trailing edge.

2. The airfoil of claim 1, wherein the set of dimples are arranged in rows in the stream-wise direction, and at least one row is staggered with respect to the other rows.

3. The airfoil of claim 2, wherein the set of dimples are arranged in columns in the span-wise direction.

4. The airfoil of claim 1, wherein the non-perforated section constantly increases in depth in the stream-wise direction.

5. The airfoil of claim 4, wherein each dimple of the set of dimples extends a stream-wise length between the leading edge and the trailing edge, and a depth of each dimple first increases from the dimple leading to a maximum depth and then the depth then decreases from the maximum depth to the dimple trailing edge.

6. The airfoil of claim 5, wherein a steam-wise location of the maximum depth of each dimple of the set of dimples is provided within an area of the dimple extending between greater than 50% and less than 100% of the stream-wise length.

7. The airfoil of claim 5, wherein a portion of the non-perforated section from the maximum depth to the dimple trailing edge defines a curved cross section when viewed in the span-wise direction.

8. The airfoil of claim 1, wherein the at least one lateral edge converges from the dimple leading edge and to the dimple trailing edge.

9. The airfoil of claim 1, wherein the dimple leading edge includes a rounded edge and the at least one lateral edge extends from the rounded edge.

10. A gas turbine engine comprising:
    a first airfoil including:
        a pressure side, a suction side, a leading edge, a trailing edge, a root, and a tip, wherein the leading edge and the trailing edge define a stream-wise direction, wherein the root and the tip define a span-wise direction, and wherein a throat is defined by a minimum distance between the suction side of the first airfoil and a trailing edge of a second airfoil adjacent the suction side of the first airfoil, the throat defining a span-wise direction throat line on the suction side; and
        a set of dimples on the suction side, each of the dimples of the set of dimples having a non-perforated section, wherein the set of dimples have a first density in an area between the span-wise direction throat line and the trailing edge, wherein the set of dimples have a second density in an area between the span-wise direction throat line and the leading edge, wherein the first density is greater than the second density.

11. The gas turbine engine of claim 10, wherein the set of dimples are arranged in rows in the stream-wise direction, and at least one row is staggered with respect to the other rows.

12. The gas turbine engine of claim 10, wherein the non-perforated section increases in depth in the stream-wise direction, each dimple of the set of dimples extends in a stream-wise length between a dimple leading edge and a dimple trailing edge, and the depth first increases from the dimple leading edge to a maximum depth and then the depth decreases from the maximum depth to the dimple trailing edge.

13. The gas turbine engine of claim 12, wherein a steam-wise location of the maximum depth of the dimple is provided in an area of the dimple extending between greater than 50% and less than 100% of the stream-wise length.

14. The gas turbine engine of claim 12, wherein a portion of the non-perforated section from the maximum depth to the dimple trailing edge defines a curved cross section when viewed in the span-wise direction.

15. The gas turbine engine of claim 12, wherein the depth constantly increases from the dimple leading edge to the maximum depth.

16. The gas turbine engine of claim 12, wherein the depth constantly decreases from the maximum depth to the dimple trailing edge.

17. The gas turbine engine of claim 10, the first airfoil is provided within at least a portion of at least one of a compressor section, a turbine section, a fan section, an exhaust section or a bypass duct of the gas turbine engine.

18. The gas turbine engine of claim 10, wherein the suction side defines a convex portion of the airfoil and the pressure side defines a concave portion of the airfoil.

19. The gas turbine engine of claim 10, wherein the set of dimples are arranged in rows in the stream-wise direction and in columns in the span-wise direction, with the set of dimples having a greater number of at least one of rows or columns along the suction side from the throat to the trailing edge than from the leading edge to the throat.

* * * * *